United States Patent [19]

Brichta et al.

[11] Patent Number: 5,194,457
[45] Date of Patent: Mar. 16, 1993

[54] ZEOLITIC NUCLEANTS FOR CRYSTALLINE POLYOLEFINES MODIFIED BY MEANS OF MACRORADICALIC DEGRADATION

[75] Inventors: Corrado Brichta; Giancarlo Bressan; Claudio Troglia, all of Milan; Giancarlo Barbero, Arona, all of Italy

[73] Assignee: Enimont Augusta Industriale S.r.l, Milan, Italy

[21] Appl. No.: 819,631

[22] Filed: Jan. 10, 1992

Related U.S. Application Data

[63] Continuation of Ser. No. 644,598, Jan. 23, 1991, abandoned.

[30] Foreign Application Priority Data

Jan. 24, 1990 [IT] Italy ............................... 19142 A/90

[51] Int. Cl.$^5$ ............................ C08K 9/04; C08K 3/34
[52] U.S. Cl. .................................. 523/200; 524/287; 524/299; 524/450
[58] Field of Search ............... 524/286, 288, 292, 299, 524/450, 287; 523/200

[56] References Cited

U.S. PATENT DOCUMENTS

| | | | |
|---|---|---|---|
| 3,207,737 | 9/1965 | Wales | 524/398 |
| 3,367,926 | 2/1968 | Voeks | 524/94 |
| 4,016,118 | 4/1977 | Hamada et al. | 524/108 |
| 4,518,731 | 5/1985 | Zamboni et al. | 524/287 |
| 4,532,280 | 7/1985 | Kobayashi et al. | 524/108 |
| 4,585,817 | 4/1986 | Su et al. | 524/108 |
| 4,948,820 | 8/1990 | Addeo et al. | 523/124 |

FOREIGN PATENT DOCUMENTS 0113629 7/1984 European Pat. Off.

*Primary Examiner*—Paul R. Michl
*Assistant Examiner*—Tae H. Yoon
*Attorney, Agent, or Firm*—Stevens, Davis, Miller & Mosher

[57] ABSTRACT

Nucleants for thermodegradable crystalline polyolefines made up of zeolitic molecular sieves modified with at least one arylcarboxylic acid. These nucleants may be added before or during the macroradicalic degradation of the polyolefines and allow products having a high degree of nucleation to be obtained.

3 Claims, No Drawings

ZEOLITIC NUCLEANTS FOR CRYSTALLINE POLYOLEFINES MODIFIED BY MEANS OF MACRORADICALIC DEGRADATION

This application is a continuation of application Ser. No. 644,598, filed Jan. 23, 1992, now abandoned.

FIELD OF THE INVENTION

The present invention concerns nucleants for crystalline polyolefines modified by means of macroradicalic degradation.

More specifically, the present invention concerns nucleants for thermodegradable compositions of crystalline homo or copolymers of polypropylene.

BACKGROUND OF THE INVENTION

Polyolefines and more specifically polypropylene and copolymers of propylene, have a relatively low crystallization rate compared to other crystalline polymers.

The crystallized polymers may, consequently, show a low degree of crystallization, large dimensions of the crystals or a non-homogeneous crystallization, which have a negative effect on the optical (transparency, translucence, etc..) mechanical (elasticity modulus, ultimate tensile stress, etc..) and rheological (moulding cycles and dimensional stability) properties of the injection moulded products.

To overcome these disadvantages, suitable nucleants are added to the above polymers.

The use of inorganic additives such as talc, silica, carbon-black and kaolin is already known. However these products have a limited nucleant effect.

The use of organic nucleants which favorably modify the crystallization process of crystalline polymers and copolymers of propylene, including mono or dibasic salts of aliphatic acids, such as sodium succinate, sodium glutarate, sodium caproate, etc.. is also known.

The use of the salts of alkaline metals or the aluminium salts of aryl carboxylic acids, such as aluminium benzoate, sodium or potassium benzoate, sodium beta-naphthoate, lithium benzoate, aluminium mono hydroxy -di-p.tertbutyl benzoate, etc.. is also known.

The use of organic nucleants, for example for isotactic polypropylene, is described in the U.S. Pat. Nos. 3,207,737, 3,367,926, 4,016,118, 4,532,280 and 4,585,817.

However the use of these organic nucleants has several disadvantages mainly due to the difficulty in being homogeneously dispersed in the polymer because of their low compatibility, their tendency to segregate in the dry mixing process and also their tendency to sublimate when the transformation temperature is high. Furthermore, some nucleants show the so-called "plate out" phenomenon, i.e. separation from the polymer and consequent deposit on the surface of the mould and final product.

Finally, it should be pointed out that all the above organic additives do not allow the heterogeneous nucleation of crystalline polymers with a controlled rheology modified by means of macroradicalic reactions at high transformation temperatures.

The European patent application 85,968 describes the use of nucleants made up of a combination of an aromatic monocarboxylic acid with a silicate or an alumina-silicate as a base, especially zeolites.

Because of their instability during the transformation of the polymer, these nucleants do not have a significant nucleant effect in polymers modified through a chemical restructurization process.

Nucleants made up of a product obtained by a reaction between an aryl carboxylic acid and a crystalline alumina-silicate of an alkaline or an alkaline earth metal, such as zeolitic tectosilicate according to the U.S. Pat. No. 4,518,731, are also unsuitable for this nucleant process on account of their thermal instability at the high temperatures required in the macroradicalic restructurization of polypropylene.

DESCRIPTION OF THE INVENTION

The applicant has discovered, and describes in the present invention, that nucleants made up of at least one zeolitic molecular sieve, having a water content which is less than or equal to 5% by weight, modified with at least one aromatic monocarboxylic acid, are stable at the high restructurization temperatures of the crystalline thermodegradable polyolefines and have a considerable nucleant effect in the moulding process.

These agents can therefore be added before or during the macroradicalic degradation of polyolefines and allow products having a high degree of nucleation to be manufactured.

The term zeolitic molecular sieve as used in the present invention and claims thereof, refers to any natural or synthetic zeolite, thermally treated until the water content is reduced to 5% or less by weight, generally between 0 and 4%.

Examples of zeolites which can be used in the preparation of the nucleants described in the present invention are those of type 3A, 4A, 5A, 10X, 13X, Y etc. in their sodium and/or potassium and/or calcium form.

4A zeolites are preferable, which, as is known, are made up of crystalline hydrated aluminium and sodium silicate having a general formula:

$Na_2O.Al_2O_3.2 SiO_2.4,5 H_2O$ and a particle size distribution of between 0.1 and 100 microns, preferably between 0.1 and 10 microns.

Any aromatic monocarboxylic acid of the kind:

Ar—COOH where Ar stands for an aromatic radical, also having more than one aromatic ring, for example, two or three aromatic rings which can be condensed, and possibly substituted with alkyl or alkoxyl radicals having a low number of carbon atoms, for example, $C_1$–$C_4$, may be used in the synthesis of the above nucleants; examples include: p-therbutylbenzoic acid, benzoic acid, naphthoic acid, toluic acid, p-ethoxybenzoic acid, p-methoxybenzoic acid, salycil acid, diphenylpropionic acid, etc.

The nucleant system described in the present invention is particularly suitable for crystalline polyolefines such as polypropylene, copolymers of propylene with ethylene or other alpha-olefines, crystalline polymers of ethylene, copolymers of ethylene with the alpha-olefines, etc.

According to the present invention, the nucleant is prepared using the following procedure:

a) thermally treating a zeolite at a temperature higher than 200° C., preferably between 250° and 300° C., possibly under a flow of dry inert gas such as nitrogen; and b) causing a reaction between the thermally treated zeolite and an aromatic monocarboxylic acid at a temperature between 150° and 350° C., preferably between 160° and 310° C.

The thermal treatment described under a) is carried out until the water content has been reduced to 5% by weight or less. The treatment at the above mentioned temperatures generally lasts between 0.5 and 4 hours.

The reaction between the zeolitic molecular sieve and the acid is carried out preferably at one atmosphere and with quantities of acid of between 8 and 20 parts by weight for every 100 parts of activated zeolite.

The nucleants thus obtained may be added to the polyolefines either before or during the relative thermodegradation processes. These procedures cause a reduction and a narrower distribution of the Molecular Weights that lead to an increase of the Melt Flow Index of the polymers and, consequently, a reduction in their viscosity in the melted state.

If added beforehand, the nucleants referred to in the present invention, may be dispersed, optionally, in a "masterbatch" form, according to normal mixing techniques which guarantee a homogeneous distribution together with other possible additives, such as stabilizers or additives required for the thermodegradation such as radicalic initiators or antioxidizers. For this purpose, normal Henschel type mixers may be used, as well as a V shape, or belt mixers, or a tumbler. Mixers at high temperatures of the Banbury type may also be used. Polymers in powder form may be used with a particle size distribution of 50 to 200 mesh or less, particularly polypropylene powders sold under the trade name of "SPHERIPOL," or else flaked polymers or chips.

The above mentioned nucleants may be added to the polyolefines in quantities which depend on the kind of polymer used but generally between 0.5 and 15% by weight, preferably between 0.8 and 2% of the total mixture nucleant plus polymer.

The selective thermodegradation of the polyolefines, especially of the homo and copolymers of propylene, is carried out using the techniques already known by experts in the field, in the presence of a radicalic initiator of the C-C type and particularly the procedure described in the European patent application No. 326,166 which is referred to herewith as an integral part of the text. In this procedure the thermodegradation of the polyolefines, particularly of the homo and co-polymers of propylene, is carried out at a high temperature, between 250° and 300° C. in the presence of primary or secondary antioxidizers and derivatives of benzopinacole.

The nucleant system described in the present invention affects the temperatures and the crystallization times, increasing the former and decreasing the latter, it improves the optical properties of the moulded products and reduces the moulding times of the polyolefine to which it has been added.

More specifically, the effectiveness of the nucleant system on the temperature and crystallization rate as well as on the optical properties can be tested by means of various techniques; the most significant are based on the following physical parameters:

crystallization times and temperatures of the melted polymer, using the Differential Scanning Calorimetry (DSC) as described in H. N. Beck et al.: J. Appl. Polymer Science 9, (1965) page 2131;

transparency (Haze) according to the ASTM - D 1003 method (on samples of film obtained by the moulding process).

To enable a clearer interpretation and to allow the practical enforcement of the present invention, the following examples are listed as an illustration of said invention, without limiting it in any way.

EXAMPLE 1 (Comparative)

A sample of 5 kg of isotactic polypropylene chips, sold under the trade-name of Moplen D60 P by Himont Italia, having a Melt Flow Index (MFI) equal to 0.3 dg/min. at 230° C. and 21.6 N (ASTM D 1238/L), was thoroughly mixed in a tumbler with 0.1% by weight of an antioxidizer based on 2,6-di-tert butyl-p-cresol (BHT) together with 0.1% by weight of a phenolic antioxidizer containing sulphur (sold as Irganox 1035 by Ciba-Geigy), composed of 2,2 thiodiethyl-3-(3,5 di-tert-butyl-4-hydroxy phenyl)propionate. 0.6% by weight of a radicalic activator of the C-C type made up of 2,3-dimethyl-2,3-diphenyl butane (sold as Interox CCDFB by Peroxyd -Chemie G.m.b.H.) was added together with 0.2% by weight of calcium stearate as a lubricant. The mixture was then injection moulded at temperatures (of the molten product) of 280°-290° C., and cooled down in a mould kept at a temperature of 30° C., and 2 mm thick sheets were obtained. The crystallization and melting characteristics of the sheets were then studied. The test was carried out on a micro-sample taken from the moulded sheets, by using a differential scanning calorimeter (Perkin Elmer DSC 1B), in a nitrogen stream, at a cooling rate of 16° C./min. and with a melt increase of 8° C./min. starting from a temperature of the molten product of between 190° and 230° C. The starting temperature of crystallization and the temperature corresponding to the highest exothermic peak were then deduced from the calorimetric diagram. The individual test samples obtained from the sheets, were also submitted to the Haze test and the MFI was measured. The final results are shown in Table 1.

EXAMPLE 1A (Comparative)

100 parts by weight of a crystalline polypropylene in powder form, sold as "SPHERIPOL" Moplen YD50G by Himont, having a MFI of 0.3 dg/min. at 230° C. and 21.6N, were mixed for 30 seconds in a Henschel type turbo-mixer, with 0.1 parts by weight of BHT, 0.1 parts by weight of Irganox 1035 antioxidizer and 0.1 parts by weight of calcium stearate. To this were added 0.6 parts by weight of a radicalic initiator made up of di-(tri-methylsilyl)-fluorenone (pynacole form) having the formula (I):

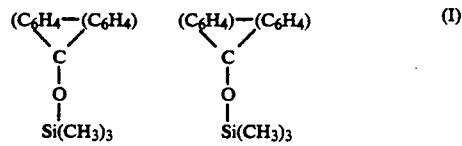

obtained by using procedure B, described by J. V. Crivello et al. in the Journal of Polymer Science: Part A Polymer Chemistry vol. 24, (1986) page 1200. Finally, 1 part by weight of a product composed of 4A zeolites, containing 10% by weight of water and p-tert-butylbenzoic acid, was added. The mixture was then extruded and granulated in a Werner-Pfleiderer twin-screw extruder of the type 2D5 K 28, with screws having a diameter of 28 mm. The procedure was carried out at a head temperature of 280°-290° C., with a load capacity of 3 kg/hr (stay time=100 seconds; screw speed=100 revs/min). Small test samples of 30×20 mm (thickness=1 mm.) were obtained from the chips by means of a moulding press at a temperature of 200°-230° C. These samples were not very homogeneous owing to the presence of bubbles and were consequently discarded as being faulty.

EXAMPLE 2

600 parts by weight of 4A zeolite sold by AUSIDET of Milan under the trade-name of Merilit B, were heated in a stainless reactor, equipped with a mixer with rotating blades and heater, at a temperature of 250° C. for about an hour in a flow of nitrogen, enabling the complete dehydration of the zeolite. 100 parts by weight of p-tri-butylbenzoic acid (TBBA) in powder form were then slowly added, with constant stirring at 180° C. for a further 30 minutes. The heating was turned off and mixing continued until the temperature decreased to below 100° C.

The reactor was discharged and the TBBA-zeolite product analyzed to establish its content of arylcarboxylic acid; the water content was then determined by calcination at 800° C. The nucleant thus obtained showed the following composition by weight:

| 4A zeolite (dehydrated) | 80% |
|---|---|
| TBBA | 15% |
| water | 5% |

To the polymer mixture composed of 5 kg of polypropylene and the other additives mentioned in Example 1 (Comparative), were added 0.5 kg of a concentrate (masterbatch based on the same isotactic polypropylene), suitably stabilized with antioxidizers and containing 10% by weight of the above-mentioned nucleant; said concentrate had been obtained by a conventional extrusion and granulation process.

The final product was extruded at 280° C. to allow for the restructurization of the polymer. The restructured polymer was then pressure moulded at 240° C. and an analysis of the nucleation activity carried out on several test samples. Table 1 shows values of the increase in the crystallization temperature as compared to Example 1, together with the values of improved transparency (decrease in the Haze value). The flow index of the polymer thus restructured and nucleated is also higher.

EXAMPLE 3

In the polymer mixture mentioned in Example 1A (Comparative) the nucleant was substituted with 1 part by weight of the powder prepared according to the procedure described in Example 2. After the mixing, extrusion at 280° C. and granulation were carried out; test samples were then prepared by means of compression moulding at 230° C. The results shown in Table 1 indicate that the crystallization temperature has increased from 102° C. to 107° C. and that the Haze value has decreased from 80% to 35% whereas the MFI values have risen from 0.3 to 20.

EXAMPLE 4

600 parts by weight of Merilit B were dried in an oven with air circulation at 300° C. for 2 hours to allow for the almost complete dehydration of the zeolite. The zeolite thus obtained was charged into a stainless steel reactor, equipped with heating and stirrer; 106 parts by weight of molten TBBA (m.p.=168° C.) were then added (slowly at 180° C.)

After stirring for 30 minutes at 180° C., the heating was turned off and stirring continued until the temperature had decreased to below 100° C.; the reactor was then discharged; the nucleant thus obtained was stable for storage and showed the following composition by weight:

| Dehydrated zeolite | 80% |
|---|---|
| TBBA | 17% |
| Water | 3% |

100 parts by weight of the crystalline polypropylene mentioned in Example 1A were mixed thoroughly (for 30 seconds in a Henschel-type laboratory turbomixer) with 0.1 parts by weight of BHT, 0.1 parts by weight of Irganox 1035 antioxydizer and 0.2 parts by weight of calcium stearate. To this were added 0.6 parts by weight of a radicalic activator made up of 2,3-dimethyl-2,3-diphenylbutane and 1 part by weight of the above nucleant. The mixture was injection moulded at temperatures (of the molten product) of 280°-290° C., with cooling in a mould kept at 30° C., thus obtaining sheets having a thickness of 2 mm. The behavior at crystallization and melting temperatures was examined by means of DSC, together with the Haze value and the MFI. Table 1 shows the values of the crystallization temperature, of Haze and flow index.

EXAMPLE 5

100 parts by weight of a crystalline ethylene/propylene copolymer (ethylene content=8% by weight), having a density=0.9 g/cm and MFI (at 230° C./21.6N)=3.5 dg/min, sold by Himont under the trade-name of Moplen EPT 30 R, were mixed in a tumbler with 0.1% of BHT antioxidizer, and 0.1% of Irganox 1035 antioxidizer and 0.2% of calcium stearate as lubricant. To this were added 0.6% by weight of a radicalic activator, made up of 3,4-dimethyl-3,4-diphenyl-hexane, sold by Peroxyd-Chemie A.G. under the name of Interox CCDFH. To this mixture were added 10 parts by weight of a concentrate based on the same copolymer, adequately stabilized with the antioxidants previously used and containing 10% by weight of the nucleant produced according to the procedure in Example 4.

The mixture was then injection moulded in a Negri and Bossi 225-640N moulding press (with a 50 mm. diameter cylinder and nozzle) at a temperature (of the molten product) of 285°-295° C. and specific pressure of 980 bar.

The cooling of the mould was kept at 30° C. 2 mm thick test samples were submitted to a DSC test to determine the crystallization temperature. The Haze value was then determined in accordance with ASTM D 1003, and finally the MFI of the nucleated polymer.

The values indicated in Table 1 show the effectiveness of the nucleant procedure proposed also for ethylene-propylene copolymers.

TABLE 1

| | Ex. 1 | Ex. 2 | Ex. 3 | Ex. 4 | Ex. 5 |
|---|---|---|---|---|---|
| Crystallization temperature (°C.) | 102 | 118 | 107 | 108 | 110 |
| Haze value (ASTM-D-1003) | 80% | 30% | 35% | 32% | 8% |
| MFI (230° C./21,6 N) | 0.3 | 12 | 20 | 18 | 20 |

We claim:

1. A process for nucleating polyolefines during thermodegradation processes carried out at temperatures between 250° and 300° C. and in the presence of radicalic initiators of the C-C type, comprising:

contacting polyolefines with 0.5-15% b.w., based on the total mixture, of at least one zeolitic molecular sieve having a water content that is equal to or less than 5% by weight, based on the weight of the total zeolitic molecular sieve, said zeolitic molecular sieve being modified with 8-20 parts by weight of at least one aromatic monocarboxylic acid having the formula:

Ar—COOH wherein Ar stands for an aromatic radical, having two or three aromatic rings which can be condensed, and optionally substituted with $C_1$-$C_2$ alkyl or alkoxyl radicals.

2. The process according to claim 1 wherein the molecular sieve is a 4A zeolite having a particle size distribution of between 0.1 and 100 microns.

3. The process according to claim 2 wherein the molecular sieve is a natural or synthetic zeolite.